United States Patent [19]

Yokoo

[11] Patent Number: 5,071,224

[45] Date of Patent: Dec. 10, 1991

[54] LENTICULAR LENS FOR USE IN BACK PROJECTION TYPE TELEVISION RECEIVER

[75] Inventor: Toru Yokoo, Tokyo, Japan

[73] Assignee: Pioneer Electronic Corporation, Tokyo, Japan

[21] Appl. No.: 560,451

[22] Filed: Jul. 25, 1990

Related U.S. Application Data

[63] Continuation of Ser. No. 358,765, May 30, 1989, abandoned.

[30] Foreign Application Priority Data

Nov. 16, 1988 [JP] Japan .................................. 63-287543

[51] Int. Cl.$^5$ .............................................. G03B 21/60
[52] U.S. Cl. .................................... 359/456; 359/455; 359/627
[58] Field of Search ............... 350/128, 129, 167, 127; 358/60

[56] References Cited

U.S. PATENT DOCUMENTS

| | | | |
|---|---|---|---|
| 2,738,706 | 3/1956 | Thompson, Jr. ................... | 350/128 |
| 4,418,986 | 12/1983 | Yata et al. ........................... | 350/128 |
| 4,490,010 | 12/1984 | Honda et al. ...................... | 350/128 |

FOREIGN PATENT DOCUMENTS

| | | | |
|---|---|---|---|
| 0114026 | 7/1983 | Japan .................................. | 350/128 |
| 0192023 | 11/1983 | Japan .................................. | 350/167 |
| 0204833 | 11/1984 | Japan .................................. | 350/128 |

Primary Examiner—Bruce Y. Arnold
Assistant Examiner—R. D. Shafer
Attorney, Agent, or Firm—Sughrue, Mion, Zinn, Macpeak & Seas

[57] ABSTRACT

A lenticular lens is provided for use in a back projection type television receiver. The lenticular lens is provided with an exit face having formed thereon a lens portion and two reflecting portions. The lens portion refracts light from a lenticule before the light emerges therefrom. The reflecting portions are on both sides of said lens portion, and each has a reflecting face erected with respect to the screen surface. Part of the incident light is totally reflected by the reflecting portion toward the lens portion whereby the light emerges from the lens portion. Because of this arrangement, the pitch between adjacent lenticules or exit faces can be reduced without rendering the lenticular lens unduly thin.

2 Claims, 3 Drawing Sheets

LENTICULAR LENS FOR USE IN BACK PROJECTION TYPE TELEVISION RECEIVER This is a continuation of application Ser. No. 07/358,765 filed May 30, 1989 now abandoned.

BACKGROUND OF THE INVENTION

The present invention relates to a "back projection type television receiver" that projects a CRT image onto a screen from the back of the screen and that allows the viewer to recognize the projected image from the front side of the screen. The present invention relates more particularly to a lenticular lens for use in a back projection type television receiver.

FIG. 6 shows the basic concept of a back projection type television receiver, wherein 3 represents projection optics comprising projection CRTs and projection lenses; 4 is a Fresnel sheet disposed on the side facing the projection optics 3; and 5 is a lenticular lens disposed on the exit face side of the Fresnel sheet 4. The Fresnel sheet 4 combines with the lenticular lens 5 to form a screen, and the light emitted from the projection optics 3 will be projected onto that side of the screen where the Fresnel sheet 4 is provided.

A Fresnel lens 4a is formed on the exit face of the Fresnel sheet 4, and the projected light passing through the Fresnel sheet 4 is converged macroscopically with the Fresnel lens 4a. The resulting, generally parallel rays of light are launched into the lenticular lens 5.

As shown in FIG. 4, the lenticular lens 5 has a plurality of lenticules 5a formed on the side facing the Fresnel sheet 4, with the individual lenticules being arranged side by side in the horizontal direction of the screen. On the opposite side (i.e., on the screen's viewing surface) there are formed a plurality of black strips 5b, which are spaced apart by an exit face 5c having a spherical, elliptical, non-spherical or otherwise shaped cross-section.

FIG. 5 is a horizontal cross-section of the lenticular lens 5. Rays of light $L_O$ incident on the lenticular lens 5 from the Fresnel sheet side 4 are refracted by a lenticule 5a and further refracted at the exit face 5c before they emerge to the front side of the screen.

A back projection type television receiver usually adopts a "three-tube horizontal arrangement" system for color synthesis in which three projection CRTS for red, green and blue, respectively, are arranged horizontally and the necessary color is synthesized on the screen. According to this system, light from the red and blue CRTs on opposite sides of the green CRT is projected at an angle on the screen. If the projected light is merely transmitted through the screen, color balance between red and green cannot be attained on either side of the screen as viewed from the front, and unevenness in color, commonly referred to as "color shading", will occur. In addition, the color on the screen is more blue when it is viewed in the axial direction of the blue CRT and more red when viewed in the axial direction of the red CRT (this phenomenon is generally referred to as color shift). As a further problem, the emerging light must diffuse by some extent on the screen in both horizontal and vertical directions in order to provide a uniform brightness distribution over the screen surface. ]The cross-sectional shapes of the lenticules 5a and exit faces 5c on the lenticular lens 5 are determined in consideration of both protection against color shift and promotion of diffusion in the horizontal direction. Diffusion in the vertical direction is assured by such means as incorporation of a diffusing material.

The pitch between adjacent black strips 5b on the lenticular lens 5, or the pitch between adjacent lenticules 5a (or exit faces 5c), is preferably small to attain a high resolution on the screen. When this pitch is reduced, the thickness of the lenticular lens 5 itself must be reduced by a substantially proportionate amount in order to maintain the optical relationship between lenticule 5a and exit face 5c. However, if the thickness of the lenticular lens 5 is reduced, not only is the rigidity of the lens impaired to make it physically vulnerable, but also the following problem occurs. When the lenticular lens 5 is used in combination with a single Fresnel sheet, the lens might separate from the Fresnel sheet in areas where gaps exist, potentially leading to image deterioration.

OBJECT OF THE INVENTION

An object of the present invention is to provide a lenticular lens whose pitch between lenticules or exit faces can be reduced without rendering the lenticular lens unduly thin.

SUMMARY OF THE INVENTION

In accordance with the present invention, there is provided a lenticular lens for use in a back projection type television receiver, in which a lens portion that refracts light from a lenticule before it emerges therefrom and a reflecting portion on both sides of said lens portion that has a reflecting face erected with respect to the screen surface are formed on the exit face of said lenticular lens, and part of the incident light is totally reflected by the reflecting portion and allowed to emerge from the lens portion. In this way, the present invention successfully attains its object, i.e., the pitch between adjacent lenticules is reduced without rendering the lenticular lens unduly thin.

DETAILED DESCRIPTION OF THE PREFERRED EMBODIMENT

Figure 1:
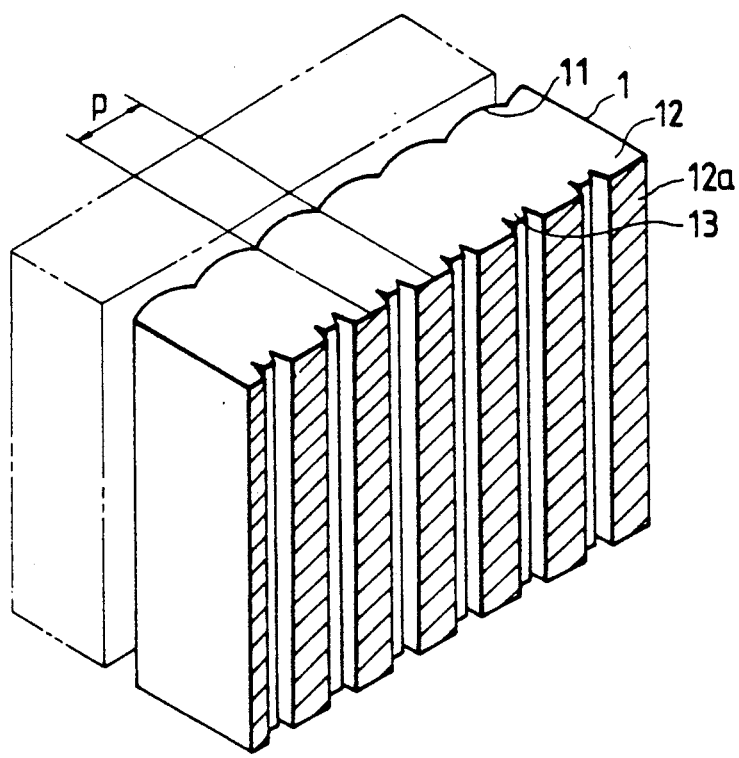
FIG. 1 is a perspective view showing a lenticular lens according to an embodiment of the present invention.
Figure 2:
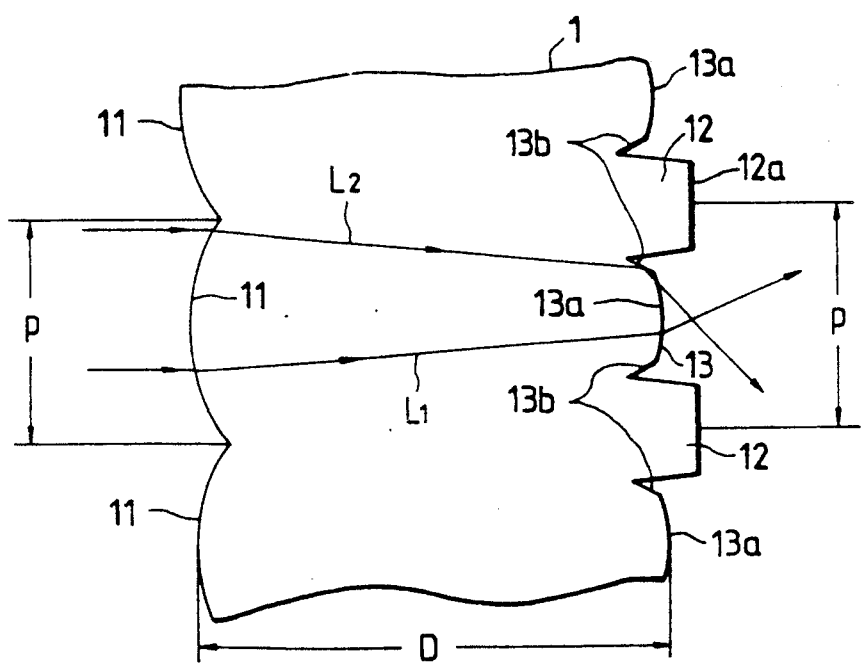
FIG. 2 is a horizontal cross-section of the lenticular lens.

FIG. 1 is a perspective view of a lenticular lens according to an embodiment of the present invention, and FIG. 2 is a horizontal cross-section of this lenticular lens. In FIG. 1, the lenticular lens is shown with part taken away.

Lenticules 11 are formed on the entrance face side of the lenticular lens 1, with individual lenticules being arranged side by side in the horizontal direction of the screen. Projections 12 are formed on the other side (i.e., exit face side) of the lenticular lens 1, with individual projections being also arranged side by side in the horizontal direction at a pitch which is generally the same as that between lenticules 11. The surface of each projection 12 is provided, by printing or some other suitable method, with a black strip 12a for preventing reduction in contrast due to such factors as reflection of extraneous light.

The width of each black strip 12a is smaller than the pitch (p) between adjacent projections 12, and an exit face 13 whose surface projects outward is formed between adjacent black strips 12a.

Figure 3:
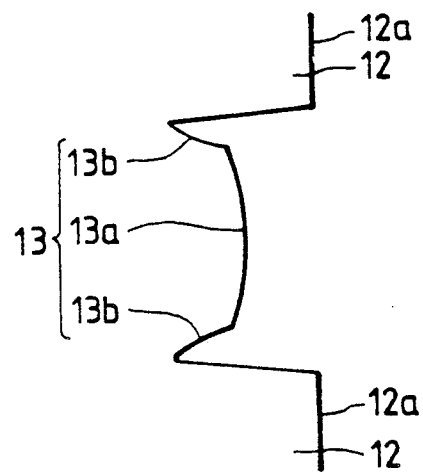
FIG. 3 is a partial enlarged view of FIG. 2.
Figure 4:
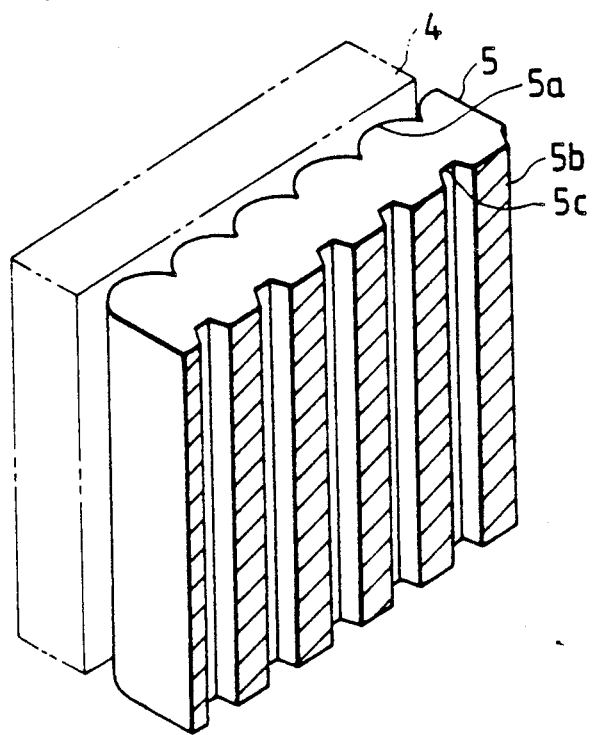
FIG. 4 is a perspective view showing part of a prior art lenticular lens.

As shown enlarged in FIG. 3, the exit face 13 is formed of a lens portion 13a having a convex surface that is slightly curved toward the exit side and a reflecting portion 13b on both sides of the lens portion 13a that is erected with respect to the screen surface (i.e., the surface parallel to black strips 12a). Each of the reflecting portions 13b is so formed that it has a slightly concave surface with respect to the projection 12 having black strip 12a. The projection 12 having the black strip 12a protrudes farther than the lens portion 13a. This, of course, makes it easy to place the black strips 12a on the projections 12.

FIG. 2 shows the ray tracing of light L that is launched into the lenticular lens 1 from the side where a lenticule 11 is formed. Rays of light $L_1$ that are directly launched into the lens portion 13a are refracted by both the lenticule 11 and the lens portion 13a and emerge from the exit face 13 at a predetermined angle.

Rays of light $L_2$ that are launched into the reflecting portion 13b are totally reflected by that portion and refracted by the lens portion 13a before emerging from the exit face 13. As a result of total reflection, the angle of incidence with respect to the lens portion 13a becomes larger than the angle at which rays of light $L_1$ passing through the lenticule 11 are directed toward the exit face 13, thus allowing light beams to emerge from the lens portion 13a in such a way that they diffuse in the horizontal direction.

In other words, there is no need to shorten the focal distance of lenticule 11 to a level comparable to the pitch (p) between lenticules 11 for the purpose of increasing the angle of light emergence from the exit face 13 as in the case of assuring light diffusion in the horizontal direction. It thus becomes possible to reduce the pitch (p) between lenticules 11 without requiring undue decrease in the overall thickness (D) of the lenticular lens 1.

Figure 5:
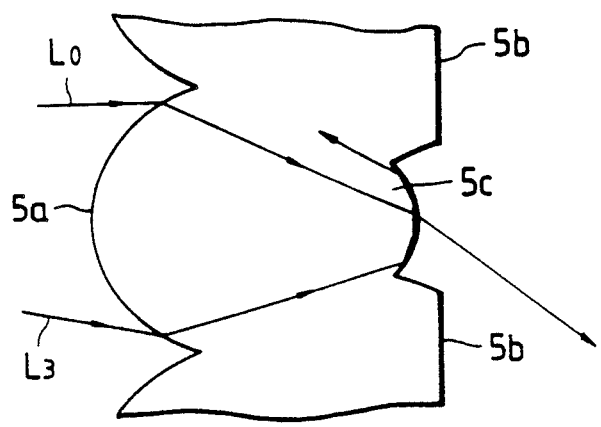
FIG. 5 is a horizontal cross-section of the prior art lenticular lens.
Figure 6:
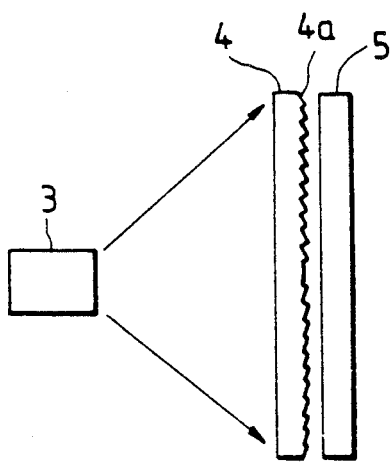
FIG. 6 shows the basic concept of a back projection type television receiver for which the lenticular lens of the present invention is to be used.

As will become apparent from FIG. 5 showing the prior art lenticular lens 5, rays of light $L_3$ incident at the edge of exit face 5c are subjected to successive total reflections by the exit face 5c itself and are simply wasted without emerging from the exit face 5c. In contrast, the reflecting portion 13b of the exit face 13 provides an erect face with respect to the lens portion 13a, so that any light incident on the reflecting portion 13b will emerge from the lens portion 13b as described with reference to FIG. 2, thereby enhancing the efficiency with which the projected light emerges from the lenticular lens.

With prior art lenticular lenses, their thickness generally ranges from 0.9 to 1.4 mm when the pitch between lenticules is 0.8–1.5 mm, and the thickness that can be realized when the pitch is 0.5 mm has been approximately 0.5 mm. On the other hand, in the embodiment described above, the thickness (D) of the lenticular lens 1 can be adjusted to 0.7 mm and more when the pitch (p) between lenticules 11 is 0.5 mm.

In the embodiment under consideration, the lens portion 13a and the reflecting portion 13b have a cross-sectional geometry that is defined by discontinuous curves. If desired, the area joining these two portions may be defined by a smooth surface. The configuration of the reflecting portion of the exit face according to the present invention is not limited to a curved surface as in the case of reflecting portion 13b and may instead be formed of a planar surface.

I claim:

1. In a lenticular lens for use in a back projection type television receiver, said lens having projected light emerge from an exit face (13) between black strips formed on the front side of said exit face, and having a plurality of lenticules (11) formed on the back side parallel to the direction of pitch between said black strips, the improvement comprising:

a plurality of parallel, vertically oriented, horizontally spaced protruding portions on said exit face;

a plurality of parallel, vertically oriented lens portions (13a) individually defined on said exit face between adjacent protruding portions of said exit face, wherein each of said protruding portions has a black strip (12a), formed on a front surface thereof, each lens portion having a convex surface on said exit face to refract light from a corresponding lenticule before it emerges therefrom; and a plurality of reflecting portions individually flanking each lens portion, each reflecting portion having a slight concave portion on said exit face to totally reflect light received from a lenticule toward an adjacent lens portion to exit therefrom, wherein each protruding portion falls rapidly from the front surface of said protruding portion so as to connect with a base end of said slight concave portion, said lenticular lens having a constant horizontal cross-sectional shape.

2. A lenticular lens as claimed in claim 1, wherein said lenticules are positioned side by side in the horizontal direction and have a certain pitch, and wherein said black strips are positioned with a pitch in the horizontal direction that is substantially the same as the pitch of said lenticules; the improvement further comprising:

each combination of lens portion and two reflecting portions being between and adjacent a pair of black strip portions.

* * * * *